Figure 1:
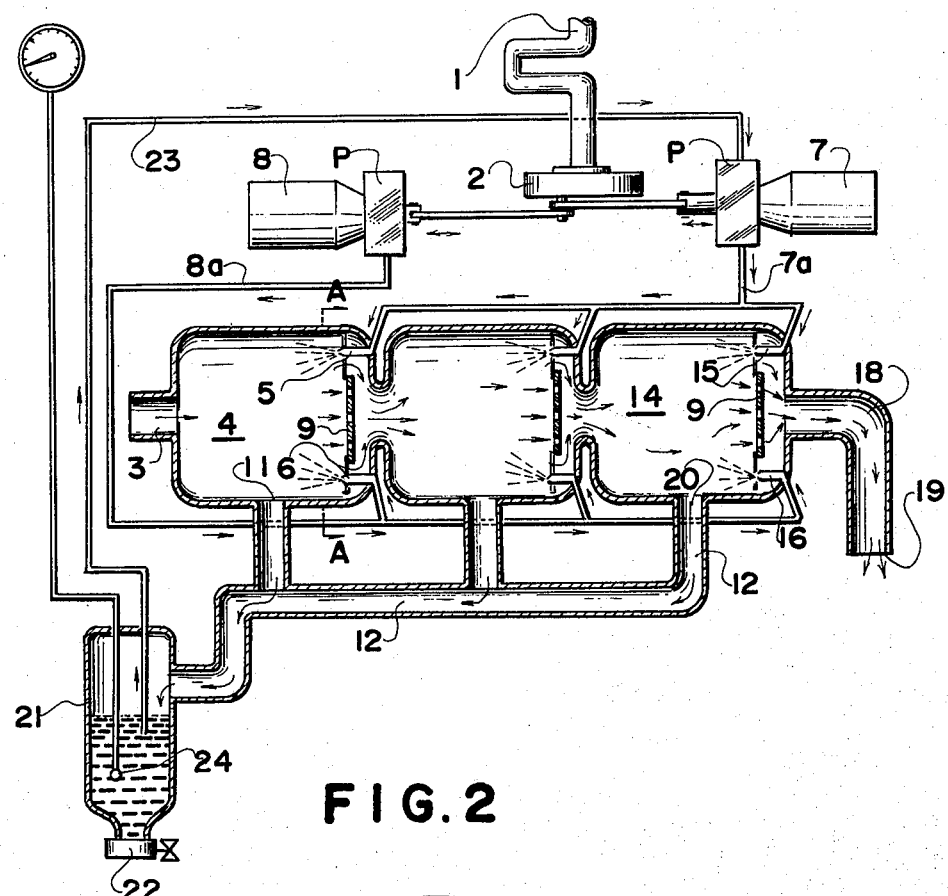

United States Patent [19]

Sohda et al.

[11] 4,301,652
[45] Nov. 24, 1981

[54] EXHAUST GAS PURIFICATION APPARATUS FOR MOTOR VEHICLES

[76] Inventors: Kathuharu Sohda; Shojiro Sohda; Keiko Sohda, all of 2-6-10, Hagoromo-cho, Tachikawa-sho, Tokyo, Japan

[21] Appl. No.: 68,667

[22] Filed: Aug. 22, 1979

Related U.S. Application Data

[63] Continuation of Ser. No. 819,978, Jul. 28, 1977, abandoned.

[51] Int. Cl.³ .............................................. B01D 53/14
[52] U.S. Cl. ...................................... 60/310; 55/228; 55/229; 55/276; 181/261; 181/268
[58] Field of Search .................. 60/310; 261/113, 117; 55/DIG. 30, 228, 229, 276; 23/284, 285; 423/212; 181/261, 268

[56] References Cited

U.S. PATENT DOCUMENTS

| 887,988 | 5/1908 | Wakley | 60/310 |
|---|---|---|---|
| 1,070,956 | 8/1913 | Hall | 261/113 |
| 2,789,032 | 4/1957 | Bagley | 60/310 |
| 3,032,968 | 5/1962 | Novak et al. | 60/310 |
| 3,132,474 | 5/1964 | Fox | 60/310 |
| 3,556,734 | 1/1971 | Peterson | 423/212 |
| 3,608,281 | 9/1971 | Gustavsson | 23/284 |
| 3,633,343 | 1/1972 | Mark | 60/310 |
| 3,708,958 | 1/1973 | Duty | 261/117 |
| 3,795,081 | 3/1974 | Reither | 261/117 |
| 3,824,769 | 7/1974 | Santos | 60/310 |
| 3,948,608 | 5/1976 | Weir | 23/284 |
| 3,989,465 | 11/1976 | Onnen | 23/284 |
| 4,039,307 | 8/1977 | Bonder | 261/117 |

FOREIGN PATENT DOCUMENTS 1452088  8/1966  France ............................ 423/212

Primary Examiner—Robert E. Garrett
Attorney, Agent, or Firm—McGlew and Tuttle

[57] ABSTRACT

A device is disclosed for treating exhaust gases from an internal combustion engine having a gas inlet adapted to be connected to the exhaust of the internal combustion engine and a plurality of serially arranged interconnected reaction chambers. The first of the chambers is connected to the gas inlet and includes a gas outlet forming a gas inlet into a second chamber. The second of the chambers has a gas outlet forming a gas inlet with a third chamber, and so on. The last reaction chamber has a gas outlet to atmosphere. A perforated gas deflector plate is mounted transversely of the path of gas flow in alignment with each outlet of the reaction chambers and spaced inwardly into the reaction chamber associated with the outlet. Means are provided for spraying purifying fluid containing an aqueous solution of sodium percarbonate and sodium bicarbonate into each reaction chamber and drain means associated with each reaction chamber draining the remains of the aqueous solution from the housing.

5 Claims, 2 Drawing Figures

EXHAUST GAS PURIFICATION APPARATUS FOR MOTOR VEHICLES

This is a continuation of application Ser. No. 819,978 filed July 28, 1977, now abandoned.

The present invention relates to an exhaust gas purification apparatus for motor vehicles, and in particular to an apparatus for purifying exhaust gas of a motor vehicle equipped with an internal combustion engine in which an aqueous solution of sodium percarbonate and sodium bicarbonate is sprayed and mixed with the exhaust gas to decompose it and to neutralize the acidity of the exhaust gas, and at the same time to make the exhaust gas odorless and harmless.

Nowadays as well known, exhaust gas of automobiles has been a serious social problem because it is a bad pollutant which causes pollution of the environment.

Ingredients of the exhaust gas bringing about such environmental pollution and causing the automobile pollution include carbon compounds, nitrogen compounds and sulfur compounds, for example COx, NOx and SOx. At the beginning, the formation of noxious gases such as CO in incomplete combustion of fuels such as gasoline and heavy oil gave rise to trouble and attempts have been made for solving this trouble by re-combustion by means of, for example, an after burner. In such a method of re-combustion, however, toxic substances such as NOx are produced. Although many others methods including catalyst systems have also been developed and tried, they have not arrived at their full practical uses yet because the methods either require expensive devices or produce insufficient purification effects.

Therefore, the present invention has been completed as a result of earnest studies for improving such drawbacks mentioned above.

Accordingly, the first object of the present invention is to purify the exhaust gas of motor vehicles.

The second object of the present invention is to silence explosion noise of the explosion gas.

An exhaust gas purification apparatus according to the present invention comprises one or a plurality of reaction chambers each of which is provided with a nozzle, a drainage hole and a transmission preventing plate for absorbing the explosion noise of exploding gases.

Figure 2:
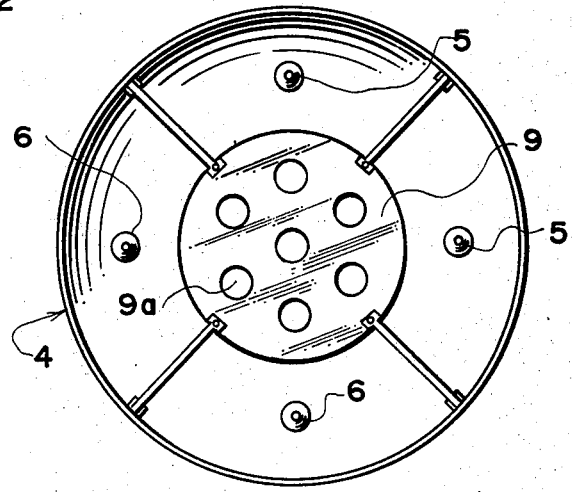

FIG. 1 is a block view of an exhaust gas purification apparatus according to the present invention; and FIG. 2 is a vertical sectional view taken along the line A—A of FIG. 1.

In the drawing, 1 is a crank shaft, 2 is means for transmitting the rotating power of the crank shaft to two pumps $P_1P_1$, 3 is a pipe, 4 is a reaction chamber, 5, 6, 15 and 16 are nozzles for spraying an aqueous reaction solution, 7 and 8 are tanks containing an aqueous solution of the reactants, 9–17 are transmission preventing plates for controlling the propagation of explosion noise, 10 and 13 are pipes connecting the reaction chambers, 11–20 are drainage holes, 12 is a transfer pipe for leading the water discharged from the reaction chamber to a storage tank 21, 18 is a exhaust tube for leading the exhaust gas to an exhaust vent 19, 22 is a water removing hole of the storage tank, 23 is a pipe for recycling the aqueous solution in the storage tank to the tanks, 24 is a pH meter, and 25 is a pH indicator gauge.

An exhaust gas purification apparatus according to the present invention will be described referring to the drawing as a preferred embodiment hereinbelow, and it should be understood that the present invention is not intended to limit to the following descriptions.

Referring now to FIGS. 1 and 2, the apparatus is driven from the crank shaft 1, of the operating engine and it includes two pumps P, P' provided in the tanks 7 and 8 to pump an aqueous solution of sodium percarbonate and sodium bicarbonate with or without the addition of dichlorbenzene in the tanks 7 and 8 through the pipes 7a and 8a and to spray the solution through the nozzles 5, 6, 15 and 16, which are arranged at circumferentially spaced intervals concentrically around plate 9, into the reaction chambers 4 and 14. The nozzles inject the solution into the exhaust gases in an upstream direction in a counterflow relationship. As seen in FIG. 1, each of the plates is located in alignment with a respective outlet of a reaction chamber, and the arrangement provides an alignment with the overall cross-section of the outlet.

The exhaust gas is introduced into the reaction chambers 4 and 14 through the exhaust tube 3 and any sound produced by exploding gases is absorbed by a perforated transmission preventing plates 9 provided upstream of the exits from reaction chambers 4, 4a and 14, and at the same time the exhaust gas is contacted with particles of the aqueous solution of sodium percarbonate and sodium bicarbonate with or without the addition of dichlorbenzene which is from the nozzles 5, 6–15 and 16 and is decomposed by the chemical reaction with these reactants to the odorless and harmless gas which is then discharged through an exhaust tube 18 from the exhaust vent 19.

In each reaction chamber 4–14, excessive drops of the aqueous solution are collected at the bottoms of the chambers, passed into drainage holes 11–20 provided at the bottom of each of the reaction chambers 4, 4a and 14 and through the pipe 12 into the storage tank 21 where the solution is stored. The aqueous solution so stored is recycled into the tanks 7 and 8 by means of the pipe 23 and the pumps P so as to be reused. The effectiveness of the aqueous solution stored after use is always indicated by the effectiveness measuring devices 24 and 25, and the aqueous solution which is decreased in its effectiveness such as to be not suitable for reuse is removed out of the motor vehicle through the removing means 22 provided at the bottom of the storage tank 21.

Thus, the exhaust gas purification apparatus according to the present invention comprises two pumps P which are driven by the automobile engine crankshaft 1. A, plurality of tanks 7, 8 in which an aqueous solution of sodium percarbonate and sodium bicarbonate pumped by the two pumps P, P. A plurality of supply pipes 7a, 8a connected to tanks 7, 8 are branched into a pluarlity of nozzles 5, 6 each end of which is projected into one or a plurality of reaction chambers which are provided in addition to the nozzles 5, 6 with transmission preventing plates 9, a pipe 12 for introducing excessive drops of said aqueous solution into a storage tank 21. The measuring sensor 24 is provided in the storage tank 21 for measuring the effectiveness of said aqueous solution stored in said storage tank. A pipe 23 connects the storage tank 21, with one of the two pumps P, P, and removing means 22 provided at the bottom of the storage tank 21 permits the removing of any aqueous solution having no effectiveness out of the motor vehicle.

Thus, in the exhaust gas purification apparatus according to the present invention, the exhaust gas is mixed in the reaction chambers with the aqueous solution of sodium percarbonate and sodium bicarbonate, if desired, together with dichlorbenzene which is sprayed thereinto and thus the exhaust gas is changed by the chemical reaction with the aqueous solution into water and elements are harmless substances which precipitate in water. Therefore, the purification apparatus is very safe and produces no secondary pollutants such as NOx which have been produced in techniques such as the recombustion method which utilizes after burners. Thus, when applying the apparatus according to the present invention to motor vehicles, it requires neither reconstructions of engines more treatments for lowering octane values.

The concentration of aqueous solution of sodium percarbonate and sodium bicarbonate in the aqueous solution used in the apparatus of the present invention may be changed depending on amounts of exhaust gas and the like and it is in general about 1 to 15%, and preferably 15 to 30%. The spraying rate of the aqueous solution may also be changed depending on amounts of exhaust gas and concentrations of the aqueous solution and it is in general about 1.5 to 5 l per minute, and preferably 5 to 25 l per minute.

The purification apparatus may be provided with one or a plurality of reaction chambers depending on amounts of exhaust gas.

The purification apparatus may be provided with one or a plurality of reaction chambers depending on amounts of exhaust gas.

Furthermore, it is desirable to provide in the reaction chambers of the apparatus with noise transmission preventing plate 9 perforated a plurality of holes 9a so as to absorb the explosion noise of exploding gas.

Now, changes in the explosion combustion will be described:

The exhaust gas from conventional motor vehicles combusting gasoline contains COx and SOx. The contents of SOx are higher in the combustion of heavy oil and gas oil. Treatments for eliminating these toxic substances by, for example, recombustion produce the toxic substance NOx, and the ecological effects of NOx are well known from publications of the Environmental Agent.

In comparison with the conventional systems such as of recombustion, in the apparatus according to the present invention all gases which are produced or have been produced are collected in and contacted with the aqueous solution of sodium percarbonate and sodium bicarbonate and decomposition is effected according to chemical reactions by cations and anions, namely the reductive and oxidative reactions, decompose the gases to produce water, i.e. $H+H+O \rightarrow H_2O$ or $O+H+H \rightarrow H_2O$ is carried out. Thus, ions of elements constituting the gas ingredients are converted into the elements in themselves. Accordingly, the following reactions are considered to take place:

with carbon dioxide $$2NaHCO_3 + CO_2 \rightarrow Na_2CO_3 + H_2 + CO_2 \rightarrow Na_2CO_3 + H_2O + 2CO_2$$

with carbon monooxide $$Na_2CO_3 \cdot H_2O_2 + CO \rightarrow Na_2CO_3 + H_2O + CO_2$$

with sulfur monoxide $$2NaHCO_3 + SO \rightarrow 2Na + 2CO_3 + H_2O + S \rightarrow Na_2CO_3 + H_2O + S + CO_2 + O$$

The sulfur S produced precipitates and the oxygen O produced contributes to the oxidative reaction or is discharged.

with nitrogen monooxide $$2NaHCO_3 + NO \rightarrow Na_2 + H_2 + 2CO_3 + NO \rightarrow Na_2CO_3 + H_2O + CO_3 + N \rightarrow Na_2CO_3 + H_2O + CO_2 + N + O$$

The $CO_3$ is then contacted and combined with sodium $Na_2$ to form $Na_2CO_3$. On the other hand, oxygen O dissolved in water is separated from the exhaust gas as air oxygen $O_2$ and contributes to the oxidative reaction where by reacting with $NH_3$ enriched in the exhaust gas to produce water as follows:

$$2NH_3 + O_2 \rightarrow N_2 + 2H_2O + H_2$$

The hydrogen ion H is converted into new water $H_2O$.

Thus a number of such reactions are repeated, and cations and anions of sodium carbonate neutralize acidic substances to produce carbon monooxide gas $CO_2$ which acts by its neutralizing reaction a catalytic effect on the reduction and oxidation. The formation of $CO_2$ and its catalytic effect bring about the decomposition and recombination of ingredients of exhaust gas, and finally the exhaust gas is purified and neutral gas is discharged from the exhaust vent into the atmosphere. Accordingly, no acidic substances are found, which have been observed in conventional systems, in the gas treated by the apparatus according to the present invention.

Further, the plates block the transmission of high level sound since the oscillation of the sound waves of air is stopped or interrupted by the holes 9a of the plates 9 and thus noise may be absorbed or eliminated.

Chemical reactions according to the present invention produce no pollution. As well known, chemical substances consist of cations and anions, and are subjected to chemical changes by the reduction and oxidation and decomposed in the presence of a catalyst to change in their molecular structures into other substances. The progress in chemistry involves various actions which may change the natural organization and may relate to the destruction of the nature. Today some of such chemical actions have been destroying the social environment by the diffusion of harmful pollutant substances.

In this connection, it is impossible to achieve an environment free from pollution unless artificially produced harmful substances are treated with neutralizing substances which have effects making harmless for the.

That is to say, it is most important to change into harmless substances or to neutralize harmful substances in the treatment of exhaust gas from motor vehicles. The present invention provides a method and apparatus of treating exhaust gas according to the principle described above. In such treatment it is impossible to apply a method such as the sterilization of drinking water by chlorine, and the use of, for example, chlorine perioxide ($Cl_2 + O_2$) should be avoided as a decomposing agent. According to the pollution eliminating treatment of the present invention, harmful substances having an oxygen radical are subjected to the reduction to take away the oxygen radical from these substances, and harmful substances having a hydrogen radical are subjected to the oxidation to produce water H2O by the reaction of the hydrogen radical with oxygen. Although such reactions are also progressing in the air, the reactions do not occur when the balance of the natural organization or construction is spoiled causing the increase in pollutant substances which are connected with the dangerous environmental destruction.

Thus, since the reactions which normally occur in the air are carried out previously in water within the apparatus of the present invention, the method and apparatus of the present invention provide advantages that the harmful substances are not diffused into the atmosphere, and at the same time the harmful substances are treated in the most preferable state for reaction.

As apparent from the preceding descriptions, the apparatus of the present invention is an apparatus for performing a method of reaction by purifying harmful substances collected in the aqueous solution according to the present invention. Thus, harmful substances having an oxygen radical such as COx, SOx and NOx are contacted with hydrogen (H) radical in the aqueous solution of sodium bicarbonate to form water.

Moreover, cyano compounds contained in the exhaust gas are neutralized by the alkaline reaction of sodium percarbonate, and ammonia also contained in the exhaust gas reacts with dichlorbenzene and sodium of sodium carbonate to ammonium chloride and sodium chloride which are harmless substances.

In the present invention, the purification reaction is carried out in the aqueous solution of sodium carbonate in plate of the air naturally, namely the aqueous solution of sodium carbonate serves as a catalyst for the decomposition reaction.

In the natural purification reaction, substances such as COx, NOx and SOx are catched in the rain; COx react with water in the rain to form carbon dioxide and carbon, SOx produce sulfur and oxygen, and NOx produce nitrogen and oxygen, these harmless substances produced are restored to the atmosphere. All of these reactions are carried out in the water of the rain.

However, since the purification of harmful substances produced mechanically is necessary to perform in a special apparatus, the neutralization of acidic substances by using of harmless substances should be carried out as rapid as possible, but secondary or tertially pollutant substances must not be produced.

The purification apparatus of the present invention satisfies all these requirements; for example, the exhaust gas when produced in the combustion of gasoline and the air in a ratio of 1:14 can be made harmless by collecting it in the aqueous solution containing effective ingredients defined by the present invention in a suitable concentration described hereinbefore which is sufficient for the decomposition, reduction and oxidation of the exhaust gas, contacting it with and passed through the aqueous solution.

Furthermore, the best manner to make the exhaust gas harmless completely is a way in which the exhaust gas is pressurized and then introduced into the reaction chambers containing the aqueous solution according to the present invention, and this operation is repeated. In such cases a pluarlity of means for injecting the pressurized exhaust gas into the aqueous solution according to the present invention may be used.

What we claim is:

1. A device for treating exhaust gases from an internal combustion engine having a rotatable crankshaft, comprising a housing having a gas inlet adapted to be connected to the exhaust of the internal combustion engine and a plurality of serially arranged interconnected reaction chambers, the first of said chambers being connected to said gas inlet and having a gas outlet forming a gas inlet into a second chamber, and the last of said chambers having a gas outlet to atmosphere, each of said gas inlets and each of said gas outlets cooperating with said associated reaction chamber to provide a path of gas flow therethrough from said gas inlet to said gas outlet, a flat perforated gas deflection plate mounted transversely of said path of gas flow in alignment with the overall cross-section, each of said gas outlets and spaced upstream thereof in the respective reaction chamber associated with each of said outlets so as to deflect exhaust gases from midflow therearound and through the perforations thereof, means for spraying a purifying fluid containing an aqueous solution of sodium percarbonate and sodium bicarbonate into each reaction chamber upstream said perforated plate in an upstream direction into the exhaust gases in a counterflow relationship with said gases, and drain means associated with the bottom of each reaction chamber for draining the remains of the aqueous solution from said chambers, wherein said means for spraying a purifying fluid containing an aqueous solution includes a tank having the aqueous solution therein, pump means associated with said tank for pumping the aqueous solution, and nozzles connected to said pump means, said nozzles being arranged around said plate at circumferentially spaced intervals concentrically around the plates to inject the purifying fluid into each reaction chamber.

2. A device according to claim 1, including a storage tank connected to said drain means for receiving the remains of the aqueous solution, and sensing means in said storage tank for measuring the effectiveness of the aqueous solution by determining the pH factor thereof.

3. A device according to claim 1, including sensing means connected to said drain means for sensing the effectiveness of the aqueous solution in treating the exhaust gases.

4. A device according to claim 3, wherein said aqueous solution contains sodium percarbonate and sodium bicarbonate in a concentration of 1 to 30%.

5. A device according to claim 4, wherein said means for spraying the aqueous solution is effective to supply it at a rate of 1.5 to 25 liters per minute.

* * * * *